US009524341B2

(12) United States Patent
Pulnikova

(10) Patent No.: US 9,524,341 B2
(45) Date of Patent: Dec. 20, 2016

(54) RETRIEVAL SYSTEM AND METHOD OF SEARCHING OF INFORMATION IN THE INTERNET

(75) Inventor: Valentina Pulnikova, Villingen-Schwenningen (DE)

(73) Assignee: Valentina Pulnikova, Villingen-Schwenningen (DE)

( * ) Notice: Subject to any disclaimer, the term of this patent is extended or adjusted under 35 U.S.C. 154(b) by 370 days.

(21) Appl. No.: 13/076,688

(22) Filed: Mar. 31, 2011

(65) Prior Publication Data
US 2011/0179077 A1 Jul. 21, 2011

Related U.S. Application Data

(63) Continuation of application No. 11/959,501, filed on Dec. 19, 2007, now abandoned.

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
USPC ................................................ 707/737–738
See application file for complete search history.

(56) References Cited

U.S. PATENT DOCUMENTS

| 5,369,763 | A | 11/1994 | Biles |
| 5,842,206 | A | 11/1998 | Sotomayor |
| 5,907,838 | A | 5/1999 | Miyasaka et al. |
| 6,233,575 | B1 | 5/2001 | Agrawal et al. |
| 6,381,607 | B1 | 4/2002 | Wu et al. |
| 6,427,123 | B1 | 7/2002 | Sedlar |
| 7,139,747 | B1 * | 11/2006 | Najork |
| 2002/0010708 | A1 * | 1/2002 | McIntosh ....................... 707/500 |
| 2002/0040363 | A1 * | 4/2002 | Wolfman et al. ................. 707/5 |

(Continued)

*Primary Examiner* — Jeff A Burke

(57) ABSTRACT

A retrieval system and a method of searching of information in the Internet are proposed. The algorithm of allocation of information about Web sites in the database of retrieval system and the algorithm of searching of information are based on the Global Classification of Information in the Internet. The retrieval system designed for searching of information in the Internet comprise a interconnected with the Internet server of retrieval system including multi-language Web site of retrieval system with searching programs and database of retrieval system. The retrieval system comprises also plural network servers wherein information, that is belong to information suppliers, is stored. The retrieval system also provides organization of a data transfer for automatic systems, and provides organization of an automatic collection of information. The users of retrieval system, computers of which interconnected with the Internet, can be as suppliers of information as searchers of information. The method of searching of information in the Internet comprise a procedure of registration of Web sites by information suppliers, a procedure of forming database of information about registered in retrieval system Web sites, including procedures of forming database of information of retrieval system and renovate and addendum information to database of retrieval system, a procedure of searching of information and procedure of selecting of required data from results of the search.

5 Claims, 12 Drawing Sheets

(56) References Cited

U.S. PATENT DOCUMENTS

2002/0178015 A1* 11/2002 Zee .................................. 705/1
2003/0061243 A1* 3/2003 Kim et al. .................... 707/200
2004/0162738 A1* 8/2004 Sanders et al. ................... 705/1
2004/0167931 A1* 8/2004 Han .......................... 707/104.1
2008/0059461 A1* 3/2008 Brock et al. ...................... 707/6

* cited by examiner

| Application form for registration of Web sites in Retrieval System |  |
|---|---|
| URL address of Web site | |
| Name of owner of Web site | |
| Home address or official address of owner of Web site, e-mail address | |
| Name of required division of the Global Classification of Information in the Internet ▽ | |
| Key words, which characterized information presented in Web site | |
| Kind of information ▽ | |
| Author of information | |
| Country of the Web site ▽ | |
| Language of information ▽ | |
| Free or fee-based of information ▽ | |
| Free access to information or needed registration procedure ▽ | |
| Characteristics of information specific for selected division of the Global Classification of Information in the Internet ▽ | |

Fig. 4.

Application form for registration of Web sites in Retrieval System

URL address of Web site

⋮

Name of division of the Global Classification of Information in the Internet ▼    Electric motors

Global Classification of Information in the Internet ☒

⋮

[+] 2 - Natural sciences

[−] 3 - Engineering. Technology

[+] 30 - Engineering and technology in general

[−] 31 - Power engineering

⋮

[−] 31.2 - Electrical power engineering Electrical engineering

[+] 31.2.1 - Theoretical electrotechnics

⋮

[−] 31.2.6 - Electrical machines, apparatus, electrical systems

⋮

[+] 31.2.6.1 - Electrical apparatus

[−] 31.2.6.2 - Electrical machines

⋮

31.2.6.2.2 - Electric motors

⋮

[+] 31.29 - Utilization of electrical energy

⋮

[+] 39 - Transport

Fig. 5.

RETRIEVAL SYSTEM AND METHOD OF SEARCHING OF INFORMATION IN THE INTERNET

BACKGROUND OF THE INVENTION

1. Field of the Invention

This invention relates, in general, to retrieval systems and methods of searching of information in the Internet.

2. Description of the Prior Art

At present the Internet is one of the main sources of information for people together with TV, the radio, newspapers, books, magazines and other kinds of press products.

The main part of information in the Internet is present in the form of Web sites, which are stored on the numerous network servers. Retrieval systems are used for the search of information in the Internet. These are Google.com, Yahoo.com, Search.com, Rambler.ru and others. Web sites are registered in retrieval systems. Web sites specify URL addresses and key words for Web sites in whole and for separated Web pages. This information is stored in database of server of retrieval system.

In order to find needed information, a user has to fill any key words in the specified field in a retrieval system. The search for information is performed on the basis of said key words. The search for information is implemented with the help of special searching programs that retrieve relevant key words in databases of the retrieval system and provide corresponding links to the accessible Web sites and/or Web pages in the Internet. The collected information is stored on the server of the retrieval system in the form of a list of URL addresses of Web sites and Web pages corresponding to key words specified by the user. The user normally sees on a screen of his computer a portion of the collected information, i.e. a list with 10-20 URL addresses out of the total number of the Web sites found by the retrieval system. Then user can get an access to any Web site and/or Web page with the help of the browser by selecting a corresponding URL address provided by the retrieval system.

There are various algorithms of searching on the basis of key words used by retrieval systems. The common feature of these algorithms is that for some requests extremely long lists can be provided with hundreds, thousands and even millions of URL addresses, if according to the retrieval system there is any relation between the requested keywords and the provided URL addresses. For the available amount of information in the Internet, this situation is not uncommon. In most cases the user is unable to browse all the provided offered information. As experience shows, there is no need to browse all the provided URL addresses, because there are only a few tens or a few hundreds of addresses, which are truly related to what the user is looking for. The rest of information is in the most cases irrelevant to the request. This is variegated information from different branch of knowledge of people or from different field of activity of people and so on. Moreover, it is not always certain that the required information could be found on the first page of result of search, even. The above mentioned problem takes place, because a search via key words is based on mathematical algorithms, such as a comparison of requested key words with key words specified for or in Web sites, an estimation of a number of matches between the requested key words and the words in the title or in the text of Web pages, and so on. The search results on the basis of mathematical algorithms do not always represent the meaning of site's information. Therefore the user gets a huge amount of unnecessary information on his request. As the amount of information in the Internet steadily increases, this problem will worsen. The improvement of search algorithms operating on the basis of key words will not solve this problem, because identical key words can be situated in sources of information belonging to different branches of knowledge, different fields of people's activity and so on.

A flow of unnecessary information slows down operation of local and global computer networks increases demands for extra space on hard disks of servers of retrieval systems, puts additional requirements on improvement of searching programs based on analysis of key words and causes inefficient usage of other material and human resources.

A special skill is needed in the selection of key words in order to find required information. A change of the order of key words, a change of the search phrase often affects the search result. If key words have homonyms one can get information for needed and not needed significances of these key words.

Existent retrieval systems do not provide a possibility of selecting of the required data from obtained results of searching on the basis of specified criterions.

Existent retrieval systems do not give any guarantee to owners of Web sites that their site will appear in the list of search result even if its content completely corresponds to the specified key words. Some retrieval systems apply mathematical methods for estimation of the specified key words. Some retrieval systems apply mathematical methods for estimation of popularity and ranking of Web sites, which gives a possibility for the Web sites with the highest rank to appear in the list of the first 10-20 URL addresses. For artificial increasing the rating of a Web site, some owners of Web sites create spam-Web sites, which increase number of references to needed Web sites. Some companies of Web designers elaborate and propose methods of increasing rating of Web sites. These measures not improve situation for searches of information.

Some retrieval systems attempt to improve the quality of search of information by introducing catalogues. Catalogues are available at Google.com, Yahoo.com, Apport.ru and others. These catalogues have a small numbers of the main categories (generally less than 20). But this is insufficient for the existing amount of information available in the Internet and does not solve the problem of improvement of the quality of the search of information in the Internet. These catalogues typically include the following categories: computers, work, education, house, society, entertainment, recreation, sport, manufacture, business, Internet for kids, mass media, inquiries and so on. Obviously, retrieval systems make attempts to classify information on edutainment and entertainment, as this kind of information seems more popular among the users of the Internet in opinion retrieval systems. However, all the information available in the Internet must be classified including information required for scientists, politicians, students and others.

There are a great number of patents devoted to the problem of the search of information in the Internet. The following patents are more relevant to the subject of the proposed invention.

In patent, U.S. Pat. No. 5,369,763 "Data storage and retrieval system with improved database structure" by Biles from 29th of November 1994, a system of storing and searching information, based on the modified Library of Congress of USA Classification System, is proposed for a local computer system. According to this patent, data on numerous topics and subjects are stored in the Subject Database. Descriptor phrases, associated with an every subject and topic, are introduced into this Data Base together with identifying information. Data based on a classification system are stored in the Typology Database. The Identification Database facilitates an access to the information stored in the Subject Database. Titles of topics, designation numbers and corresponding descriptor phrases, identification information from the Subject Database are stored in the Composite Catalogue. With the help of stored descriptor phrases related to a specific topic, a user can find needed information. This information is searched in the following way. The user selects the descriptor phrase. Then the number of this descriptor phrase is searched in the Composite Catalogue. The desired information is searched using this number. An alphabet sorting and sorting on the basis of the level in the catalogue are proposed in this patent. Only the use of specified descriptor phrases is proposed to use in said patent. Arbitrary descriptor phrases cannot be used for search in this patent. This limits freedom and capability of searching. Moreover, the proposed retrieval system does not deal with search of information in the Internet.

In patent, U.S. Pat. No. 5,907,838 "Information search and collection method and system" by Miyasaka et al. from $25^{th}$ of May 1999, the method of searching for information in the Internet based on object-oriented programming is proposed. According to the proposed method, properties are set for information units for each category of class and the method of data collection is described for each property. A user formulates his request for search of required information in terms of key words, which is transformed in a format understandable for the system. The request is then classified into the class category and information units are found according to the properties of the class, which are determined by the request of the user. This method is designed for collecting specific information in the Internet.

In patent, U.S. Pat. No. 6,233,575 "Multilevel taxonomy based on features derived from training documents classification using Fisher values as discrimination values" by Agrawal et al. from $15^{th}$ of May 2001, the method is proposed for evaluation of large text documents on the basis of Fisher value and addition of these documents into a hierarchic structure. A topic path of hierarchic structure is used along with key words for the purpose of improving searching.

Unfortunately, the problem of searching of information in the Internet not finds a full solution in existing retrieval systems and in patents literature, at present time. There is a need for determination of characteristic features of information for its structurization, storage of the data about information in the rank-order form in a retrieval system. A classification of different directions of human activity and different branches of knowledge for information, registered in a retrieval system, can be for this purpose used. In this case, a searcher of information will get information not from all volume of information of the Internet, but from part of information that is interested for a user. Thus there is a need in a search system and a method of searching of information based on a global classification of information in the Internet. Such system would be capable to structurization the entering information according to sections of classification of information and to obtaining of information according to these sections. This would be a solution for increasing the efficiency of a search for information.

At present, there are some library classifications of information available. These classifications exist some centuries before. Within these classifications a successful system of classifying a large amount of existing information has been developed. Well-known examples of such classifications are the Library of Congress of USA Classification System, the Decimal Classification, the Bibliothecal-bibliographical Classification and others. The amount of information within of largest libraries is comparable with the amount of information in the Internet. Library Classifications are convenient and simple in usage. They are logical and understandable for users. Library Classifications are constantly improving and accommodate changes happening in the information world. Evidently, some Library Classifications of information can be used as an example for the development of Global Classification of Information in the Internet. An application of any Classification of Information in the Internet for structuring and searching of information in the Internet can solve existing problems. The new classification of the information in the Internet could be represented as a catalogue, similar to the classification in the librarianship. Of course, such classification would have to be adapted to the needs and specifics of the Internet. There is a need in classifying additional sources of information, such as electronic shops, forums and others available only in the Internet. An every division and a subdivision of the catalogue cover a certain field of information. For users' comfort, a brief characteristic has to be provided for an every division and subdivision of the catalogue. An every division and subdivision of the catalogue must have a specific code. The classification must have a possibility of evolution and take into account all possible future changes in the world information system and in the Internet.

Therefore there is a need in a system and a method addressing the abovementioned problems in the search of information in the Internet.

SUMMARY

The retrieval system and the method of searching of information in the Internet are proposed in this invention. The algorithm of allocating information about Web sites in the database of the retrieval system and the algorithm of searching of information are based on the Global Classification of Information in the Internet. The Global Classification of Information in the Internet is classification of information, modified and adapted to conditions of the Internet.

During registration procedure a supplier of information fills in an application form and inserts therein the following data: an URL address of the Web site, a name of the owner of the Web site, a home or an official address of the owner of the Web site, the name of a division of the Global Classification Information in the Internet relevant to the information presented in the Web site, key words which characterize information presented in the Web site, a kind of information, an author of information, country where the Web site is situated, a language of information, free information or information to be paid for, a free access to information or a registration is required, characteristics of information specific for selected division of the Global Classification of Information in the Internet.

Data files created during the registration procedure and/or data files created during an update of the data on Web sites are sorted according to the codes of the Global Classification Information in the Internet and allocated in the corresponding parts of the database containing information on the Web sites registered in the retrieval system.

A searcher of information can find required information by searching through the tree of the Global Classification of Information in the Internet. The searcher of information can define in which division or a subdivision of the Global Classification of Information in the Internet he have to look for information. Then he inserts the name of this division into a search window of a browser of the retrieval system and begins the search. The second way of search is based on key words specified by the searcher of information. The retrieval system presents to the user a list of divisions of the Global Classification of Information in the Internet where said key words match key words provided by suppliers of information. The searcher of information has to choose a name of division of the Global Classification of Information in the Internet corresponding to his/her key words and insert the name of this division into a search window of a browser of the retrieval system and start the search. As a result of search, the retrieval system provides a list of addresses of Web sites and Web pages stored in the database and relevant to the selected division of the Global Classification of Information in the Internet.

According to the proposed invention, selecting of a required data from search results is provided in the retrieval system. This will provide additional comfort to users. During the registration procedure the retrieval system creates data files for an every Web site. The part of the information from these files will be used as criterion for selecting of the demanded information from results of search.

BRIEF DESCRIPTION OF THE DRAWINGS

These and/or other aspects and advantages of the embodiment will become more readily appreciated from the following description of the embodiments, taken in conjunction with the accompanying drawings of which:

FIG. 4 is a picture showing an example of an application form;

FIG. 5 is a picture showing a process of choosing a required division of the Global Classification of Information in the Internet;

DETAILED DESCRIPTION

Figure 1:
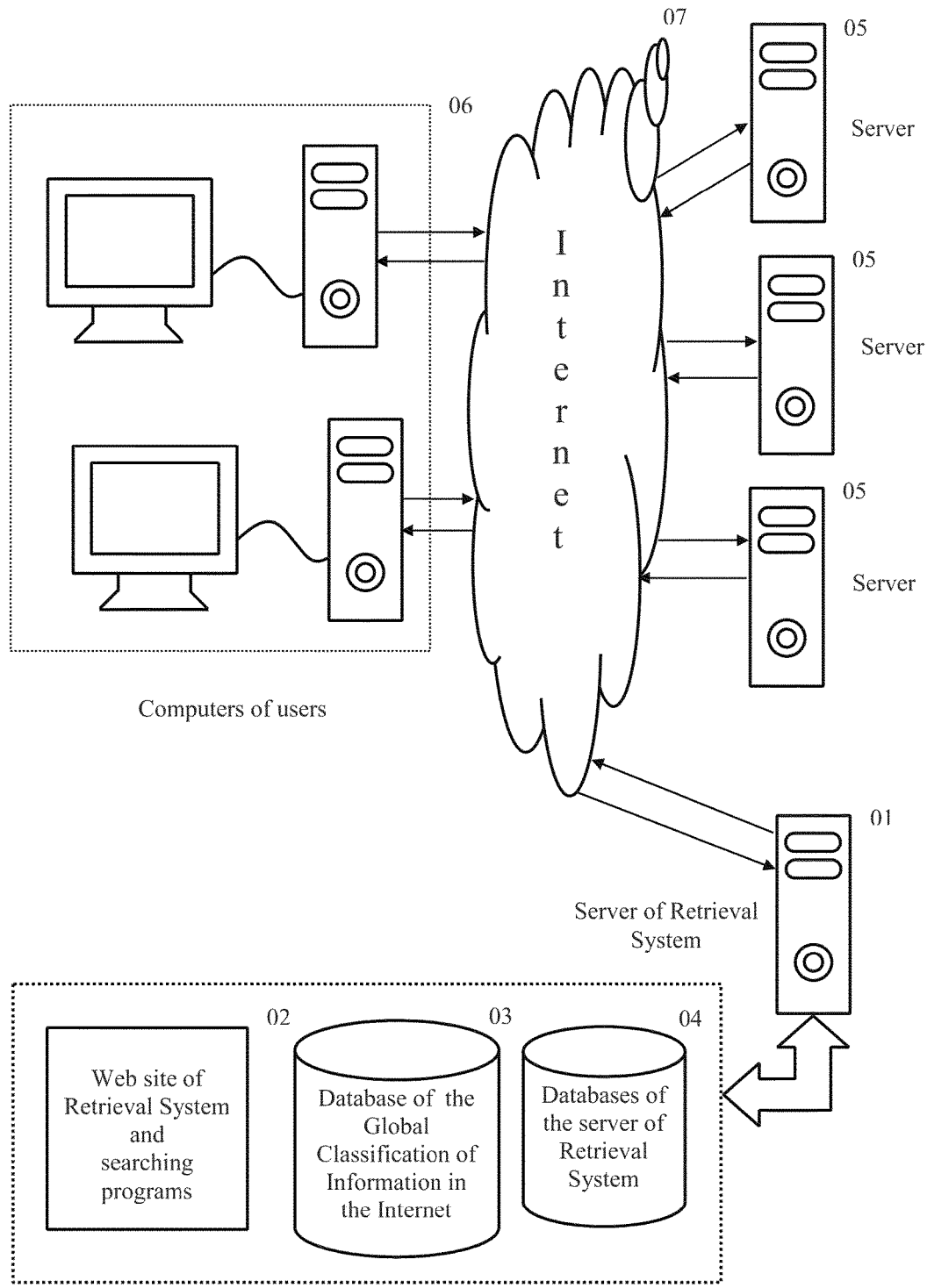
FIG. 1 is a picture showing a structure of a retrieval system.

Reference will now be made in detail to embodiments, examples of which are illustrated in the accompanying drawings.

A retrieval system, wherein acquisition, storing and searching for information is build on usage for systemization of the information of the Global Classification of Information in the Internet (GCII), is proposed in the present invention. The Global Classification of Information in the Internet is a classification, modified and adapted to conditions of the Internet. The Global Classification of Information in the Internet is a classification comprising the known forms of human activity: a material production, trade, science, education, history, culture and so on and represent the properties and characteristics of outward things, the nature, the animals and vegetal. Classifying of information in the Internet is a process of ranking and distribution of the information about Web sites in various divisions and subdivisions of a database of the retrieval system according to any essential features. To classify the information about Web sites means to specify in the database of the retrieval system the number or the name of division and subdivision of the Global Classification of Information in the Internet, which the given Web site concerns. The Global Classification of Information in the Internet represents by itself a hierarchical tree. The tree of classification looks as a multitude of the vertices (nodes), connected by lines (edges). Each vertex represents the number and the name of division (subdivision) of the Global Classification of Information in the Internet. The edges show, on what subdivisions the division is divided. From a root vertex it is possible to go down the tree to any other vertex. The vertices, which are in the end of any chain successively connected edges, are the final vertices. These vertices call "the leave vertices". The most general division corresponds to the vertex, which is the root. The last divisions correspond to leaves. To vertices of branching there correspond other names of divisions. The edges, connecting all these vertices, express the relation of submission between the more general and the less general divisions. The more general divisions are more close to the root of the tree according to hierarchy. Thus, the Global Classification of Information in the Internet represents not simply the list of divisions and subdivisions of information of all fields of knowledge. The specified classification fixes regular connections between divisions and subdivisions (vertices) for the purpose of definition of their place in the classification. Further the Global Classification of Information in the Internet includes specific characteristics of information for every division and subdivision, which will be used by any user for a future selecting of a required data from the received information. The Global Classification of Information in the Internet is classification, which will be in progress constantly and will consider changes occurred in the Internet. That is in process of occurrence of new fields of knowledge, of new types of information in the Internet, new subjects of the information in the Internet and so on there can be new divisions and subdivisions in Global Classification of the Information. Flexibility is peculiar feature of the tree of classification. So, to the tree of classification it is possible to add new vertices.

The tree of classification can have various numbers of hierarchical levels for various branches of classification depending on structure of this or that division of classification. Root divisions (root vertices) of classification will characterize the basic directions of activity of the people, for example: education, work (employment), culture, public health services, a science, the industry, agriculture, military defense and safety, the state, the international relations, sports, rest, tourism and so on. Root divisions (root vertices) of classification will have a code, for example for education: 001 and so on. The code can be alphabetic-digital, for example: O001, K003, A006 and so on. Root divisions (root vertices) include divisions (vertices) of the second level of hierarchy, for example for a science: architecture, archeology, biology, geology, the humanities, mathematics, engineering science, physics, chemistry and so on. Root vertices are parental for vertices of the second level. Accordingly vertices of the second level are in child relation to vertices of the first level (root vertices). Divisions (vertices) of the second level of hierarchy will have a code, for example for mathematics: 005.006. Division (vertex) of last level of hierarchy is the leaf vertex. This vertex will have a code consisting of codes of vertices of highest levels of hierarchy, and a code in the division, for example for any final division (leave vertex) of classification: 005.006.071.025.1310.002. Codes of divisions can be divided by any dividing sign, for example a decimal point. In this case it is easy to define number of the higher hierarchical levels for the given final division (leave vertex) of classification. In this case the number of significant figures for various divisions can be various. In general, ways of the coding of divisions depend on features of programming of Web site of the retrieval system and can be various.

The Global Classification of Information in the Internet is located in one of databases of the retrieval system. This database can represent a relational database or any other database having possibility to work with the information, representing hierarchical tree-like structure, for example NoSQL database. The database structure can be various. For example, in case of a relational database, the database can represent complex of the related tables, each of which represents the table of any hierarchical level. Primary keys in this table will represent codes of this division. Foreign keys will relate this table with tables of higher hierarchical levels. Total number of tables will equal to the maximum number of hierarchical levels of the classification. A last column of a last table will contain the information with the short characteristic and features of the last division of the classification. The database of the classification can represent one table with number of columns equal or big of the number of hierarchical levels. The database of the classification can represent one table with smaller number of columns with instructions of communication with parental and child vertices. In case of one table, a last column of this table will contain also the information, with the short characteristic and features of the last division of the classification. In case of one table, codes of vertices of the classification will be primary keys of this table. It is obvious that process of creation of the database of the Global Classification of Information in the Internet can be automated. Text files for each vertex of the classifications, representing the list of child vertices and a text code of each child vertex in the classification, should be for this purpose created. Further, depending on number of tables of the database, the program of filling of the database by means of PHP, ASP, Java EE or other programming languages on the server-side can be created. It is labour-intensive, but quite realizable process.

The part of information in the Internet can concern various divisions of the Global Classification of Information in the Internet. Such information includes, for example: news, advertising, announcements, the information of electronic shops, comments, blogs and so on. We can search for the international news, news of the separate state or region, news of medicine, news of sports and so on. If to allocate the similar information in separate division, we should relate this division with other divisions of the Global Classification of Information in the Internet. It will break tree-like structure of the Global Classification of Information in the Internet. Besides, it will essentially complicate the classification and further search of information. Therefore, it emerged that more convenient to allocate the information, concerning many divisions of the Global Classification of Information in the Internet, in the separate classification. This classification is called the Classification of Kinds of information.

The retrieval system designed for searching of information in the Internet (FIG. 1), representing a complex of hardware and software, comprises a server of retrieval system (01) interconnected with the Internet (07) including multilingual Web site of retrieval system with searching programs (02), a database of the Global Classification of Information in the Internet (03), a database of information about Web-sites, a database of the Classification of Kinds of information and the other databases of the retrieval system (04). The database of the Global Classification of Information in the Internet (03), a database of information about Web-sites and the other databases of the retrieval system (04) are located on a physical media of storage of information of server of retrieval system: hard drivers, solid state disks and others. The retrieval system also has possibility to communicate with numerous network servers (05) wherein information belonging to information suppliers is stored. Numerous computers of users (06) have possibility by means of the Internet and of Web browser to communicate with the retrieval system. The users of retrieval system having an access to the Internet can either are as suppliers of information or searchers of information or both.

Figure 2:
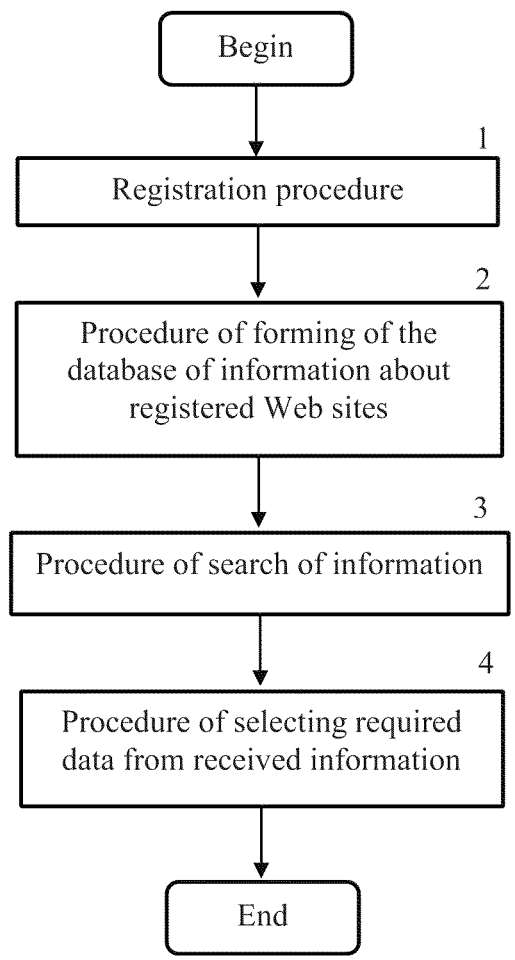
FIG. 2 is a block diagram of a method of searching of information in the Internet.

The method of searching of information in the Internet (FIG. 2) comprises a registration procedure of Web sites (1) by information suppliers in retrieval system, a procedure of building the database of information about Web sites (2) registered in retrieval system, including procedures of updating and adding of information to the database of the retrieval system, a procedure of searching of information (3) and procedure of selection of data from the search results (4).

Figure 3:
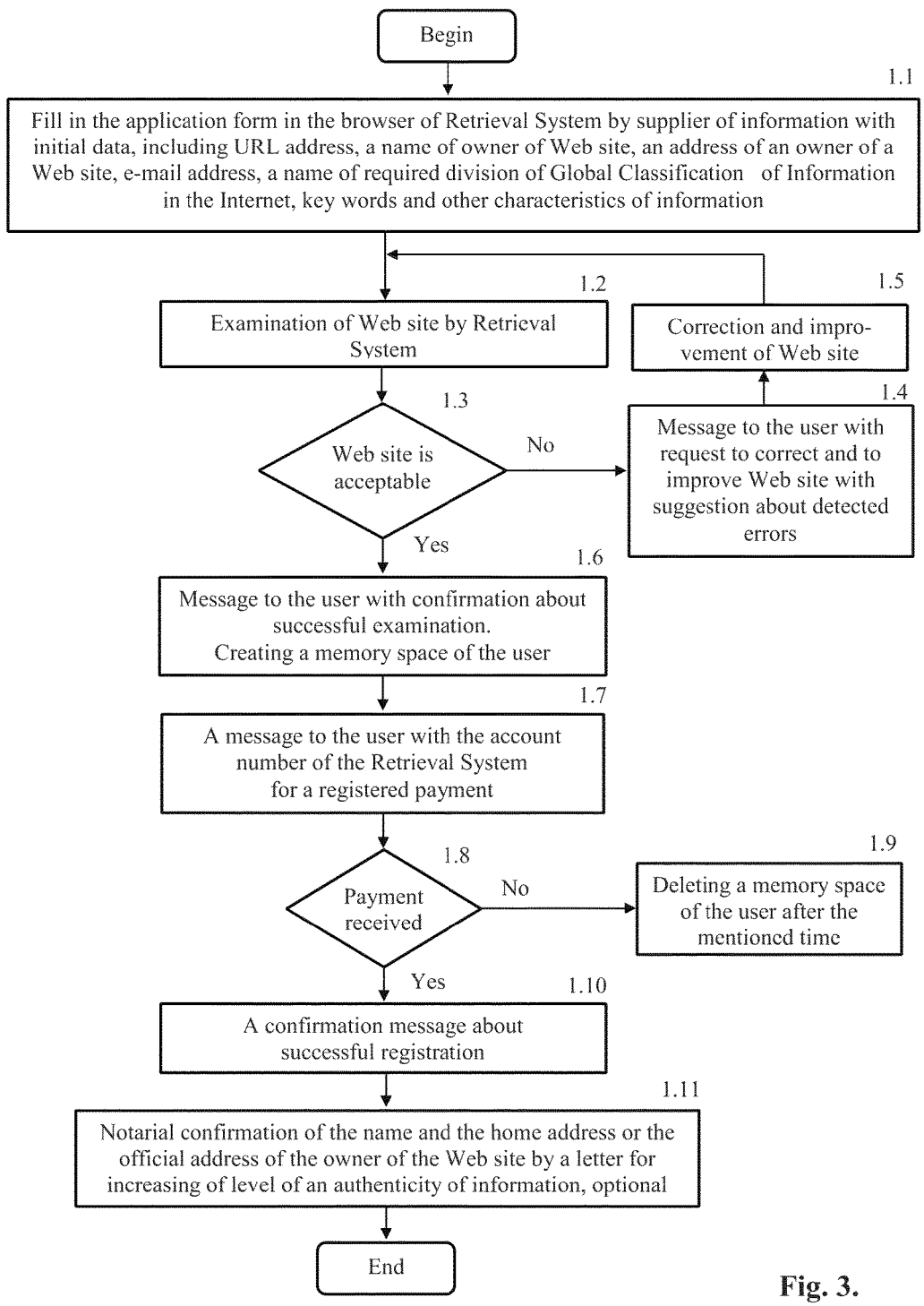
FIG. 3 is a block diagram showing registration procedure.

An information supplier has to fulfill the registration procedure (FIG. 3) in order to have information about his/her Web site included into the database of the retrieval system. The information supplier has to enter the registration page of retrieval system and fill in an application form (1.1). The application form includes the following data (FIG. 3, FIG. 4): an URL address of the Web site, a name of the owner of the Web site, a home or an official address of the owner of the Web site, an e-mail address, a name of a division or subdivision of the Global Classification of Information in the Internet relevant to the Web site, key words which characterize information presented on the Web site, a kind of information, an author of information, country, where the Web site is situated, a language of information, free information or information to be paid for, a free access to information or an access for the registered users only. If the information supplier also wishes to register separate Web pages of the Web site, he/she can fill into the application form additional data on these Web pages comprising: an URL address of the Web page, a name of a division of the Global Classification of Information in the Internet relevant to information on the Web page, key words characterizing information presented on the Web page, a kind of information, an author of information, a country and a language of information. Further the information supplier can choose any characteristics, which are specific for selected division of the Global Classification of Information in the Internet. These characteristics include in every division and subdivision of the Global Classification of Information in the Internet. For example, if the information supplier registers Web site with information about a yacht and selects division "Motor yachts", he/she can specify a tonnage of ship, a vessel speed and so on. The specified information will use for the future selecting of the demanded information from the received result of the searching also.

The retrieval system will propose a hierarchic tree of the classification system (FIG. 5) for the choice of a division of the Global Classification of Information in the Internet during registration procedure. Position of a leaf vertex on a tree can be defined, having defined the leader to it sequence of branches (beginning from a root vertex and finishing by a leaf vertex) (FIG. 5). Choosing an end division in a selected branch of the tree of the classification system would be the best option for an information supplier, because searchers of information would also most probably choose an end division of the classification (the leaf vertex) for searching. After selecting a required division of the Global Classification of Information in the Internet the information supplier has to click or press on the name of the required division of the Global Classification of Information in the Internet. Then the name of this division will appear in the right field of the application form and the corresponding number of this division will be written into a determined place in the data file of the Web site. The algorithm of visualization of a choice of demanded section of the Global Classification of Information in the Internet, described above (a FIG. 5), and also a choice of other data at filling of the application form (FIG. 4) on the side of the client, can be realized by means of programming language Java Script.

During filling the paragraph "kind of information", the retrieval system will propose different kinds of information in accordance with the Classification of Kinds of information, for example: news, advertisements, announcements, scientific information, information of electronic shops and so on. The information supplier should choose a suitable kind of information and the corresponding name of kind of information would appear in the right field of the application form and the corresponding number of this kind of information would have been written into the determined place of the data file of the Web site.

After the application form is filled, the retrieval system will create a data file of the Web site or the Web page and allocate it into an intermediate database. Then the retrieval system will evaluate the Web site (1.2, FIG. 3) with respect to readability of this site by Internet browsers, with respect to compliance of the Web site to the general aspects of the Web technology, national and international legal regulations and so on. Eventually (1.3 Yes), the user gets a message confirming a successful evaluation (1.6) or (1.3 No) a message with a request urging to correct and improve the Web site with a list of detected errors (1.4), which he should correct (1.5).

In case of successful registration of the Web site, the retrieval system creates a memory space for the user wherein the information previously provided during the registration procedure would be stored (1.6).

Then the retrieval system will ask the user to pay a registration fee (1.7). In case if no payment is received during a specified period (1.8 No), the retrieval system will delete the memory space of the user (1.9). In case if the registration fee is paid (1.8 Yes), the retrieval system will send the user a message about successful completion of the registration procedure (1.10). Whereat the information supplier can check with the help of the retrieval system that the information about his/her Web site is situated in the database of retrieval system.

The existence of a payment of an information supplier for the service of the retrieval system switches mutual relation of the retrieval system and an information supplier to a frame of a contract relation. In this case, the retrieval system is obliged to execute entered into an undertakings for the delivery of information of suppliers of information to searchers of information. In case of existing of a contract relation, the information supplier can demand of improving of quality of provided by the retrieval system service, if this quality seems to him not enough high. The retrieval system is obliged to respond for complaints of their partners.

For increasing the level of authenticity of information, the retrieval system will recommend information suppliers to provide a letter with a notarial acknowledgement of either his name and the home address of the owner of the Web site, if he/she is a private person, or a notarial acknowledgement of the name of the company and the official address of the owner of the Web site, if the owner of the Web site is a company or any other juridical person (1.11).

The date of registration of the Web site, an amount of information presented in the Web site, data confirming authenticity of information will also be included in data files built by the retrieval system.

Figure 6:
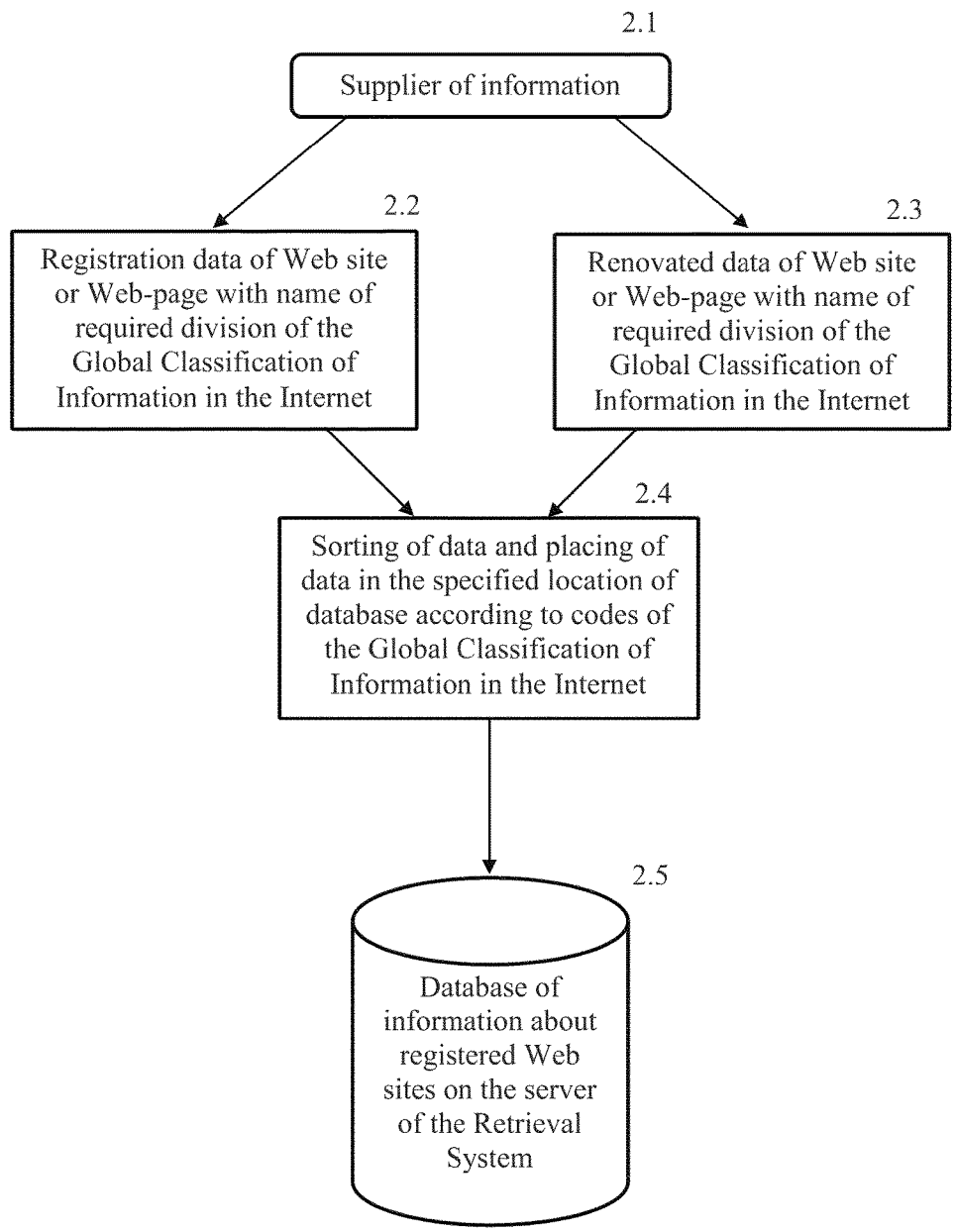
FIG. 6 is a block diagram showing a process of forming the database of information on registered Web sites on the server of the Retrieval System.

A procedure of building the database of information on the Web sites and Web pages registered in the retrieval system is presented on FIG. 6. Data files, created by supplier of information (2.1) during the registration procedure (2.2), or data files, created or modified during the process of an update of the data about Web sites and Web pages (2.3), are sorted in accordance with codes of the Global Classification of Information in the Internet (2.4) and placed into corresponding parts of the database of information on Web sites and Web pages (2.5) registered in the retrieval system. Data, storing in the database of the server of retrieval system (2.5), for every registered Web site or Web page comprise: a code of information according to the Global Classification of Information in the Internet, a URL address of this Web site or Web page, key words concerning to main content of Web site or Web pages, a kind of information according to Classification of Kinds of information, a author of information, a country, where is situated Web site, a language of information, a free or fee-based information, a free access to information or needed registration procedure, a data characterizing an authenticity of information, a volume of information, a date registration or update of information, characteristics of information specific for selected division of the Global Classification of Information in the Internet. The database of the information about Web sites and Web pages will represent the table in case of use of a relational database. Columns of this table will contain above specified data. One of columns will represent a primary key of the table. The code of information according to the Global Classification of Information in the Internet and a code of a kind of information according to the Classification of Kinds of information will be represented by foreign keys of the corresponding related tables of the data. Other data in other columns will be written down in text or in a digital format. The data about each Web site or Web page in a relational database will be contained in one row of this table.

The registered information supplier can modify and add data about his information. He can correct characteristics of existing Web site or Web page comprising key words, a kind of information, an author of information, country, where is situated Web site, a language of information, a free or fee-based information, free access to information or needed registration procedure, volume of information, characteristics of information specific for selected division of the Global Classification of Information in the Internet in case of necessity. He can add data about new Web pages of registering Web site comprising a choice of a division of the Global Classification of Information in the Internet to which this Web page are related in opinion of the information supplier. He also can insert data about characteristics of new Web pages comprising: key words, a kind of information, an author of information, a country, where is situated Web site, a language of information, a free or fee based information, a free access to information or needed registration procedure, a volume of information, characteristics of information specific for selected division of the Global Classification of Information in the Internet.

Figure 7:
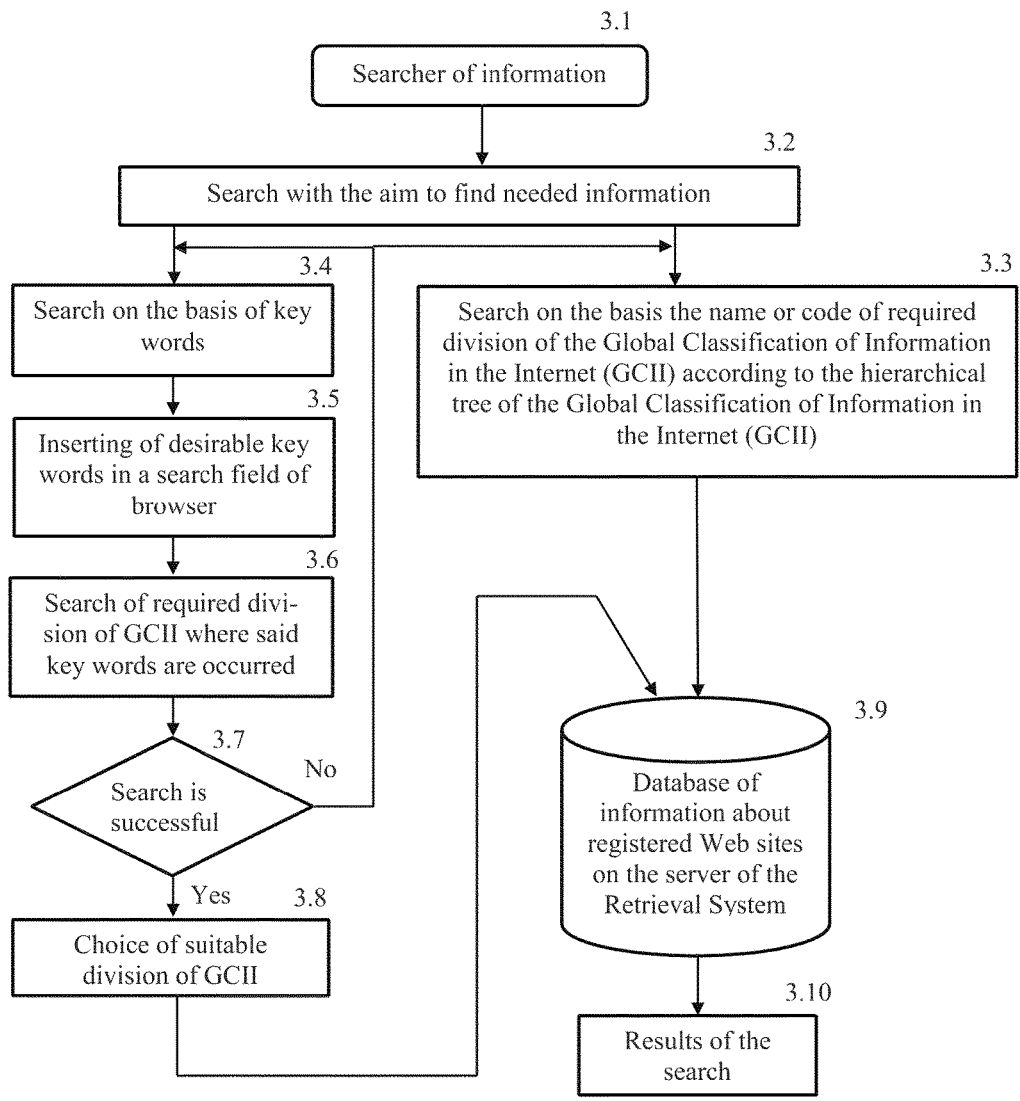
FIG. 7 is a block diagram showing a process of searching of information.

A searcher of information (3.1 FIG. 7) has two ways for finding required information (3.2). In the first way the searcher can use the hierarchical tree of the Global Classification of Information in the Internet (3.3). He defines sequence of branches of a tree beginning from root vertex and finishing by necessary vertex (section of the classification) where according to the searcher of information a data about the necessary information is located. Then the searcher of information has to insert this division or an end division into a searching window of browser of the retrieval system and starts the search. As a result of the search, the retrieval system provides the user a list of addresses of Web sites and Web pages (3.10), which are stored in the database (3.9) and correspond to the selected division of the Global Classification of Information in the Internet.

The Global Classification of Information in the Internet is the complicated tree, having of many vertices. Probably, what search of necessary section of the Global Classification of Information in the Internet on the tree, will be inconvenient to some users. The second way of search is the search based on key words (3.4). For searching the user can type any combination of key words in a searching window of browser of the retrieval system (3.5). The retrieval system gives to the user a list of divisions of the Global Classification of Information in the Internet, where said key words, inserted by information suppliers during of registration, are occurred. The searcher of information has to choose a division of the Global Classification of Information in the Internet, which to his opinion better correspondents to key words. Then he/she has to insert the name of these divisions in a searching window of the retrieval system and start searching. As a result of searching (3.6, 3.7 Yes, 3.8), as in the first case, the retrieval system will provide the user a list of addresses of Web sites and Web pages, which are stored in database and correspond to the selected division of the Classification of Information in the Internet. In the case if said key words are not encountered within the division of the Global Classification of Information in the Internet (3.7 No), the retrieval system will give a message that none of divisions contain said key words and suggest the searcher of information either to change key words or use the first way of searching (3.3).

A user can ask a question to the retrieval system in the case if some difficulties arise with determination of a required division of the Global Classification of Information in the Internet and determination of key words. Recommendations of the retrieval system for determination of key words both for searching of information and for the registration procedure will be freely available for users.

If a searcher of information is familiar with any classification of information or he/she has been using divisions of the Global Classification of Information in the Internet for some time, he/she can directly insert the name of a required division in a searching window of the retrieval system (3.3). If the user not quit correct inserts a name of required division, the retrieval system will correct his and propose to him more correct name of this division.

Figure 8:
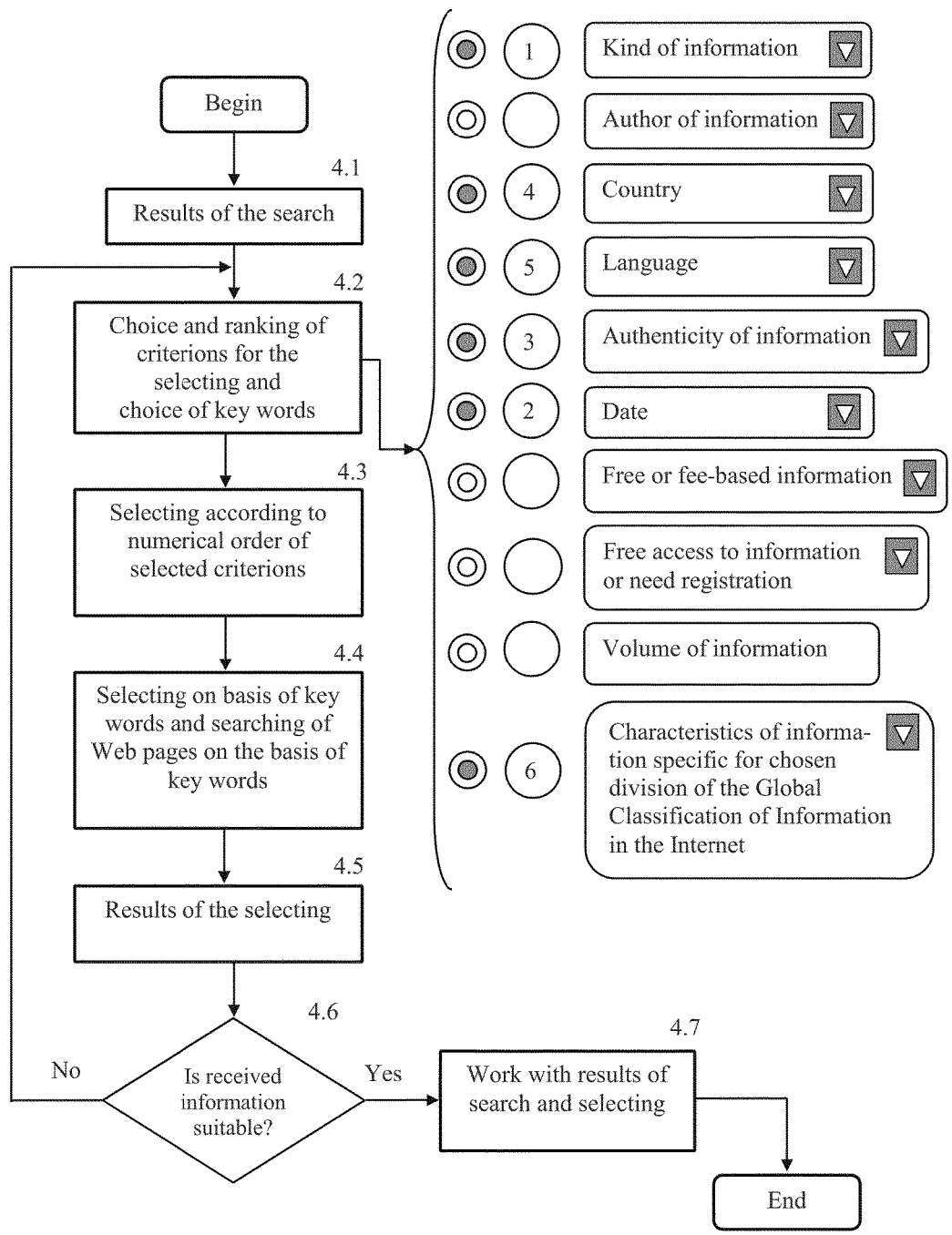
FIG. 8 is a block diagram showing a process of selecting according to predetermined algorithm.
Figure 9:
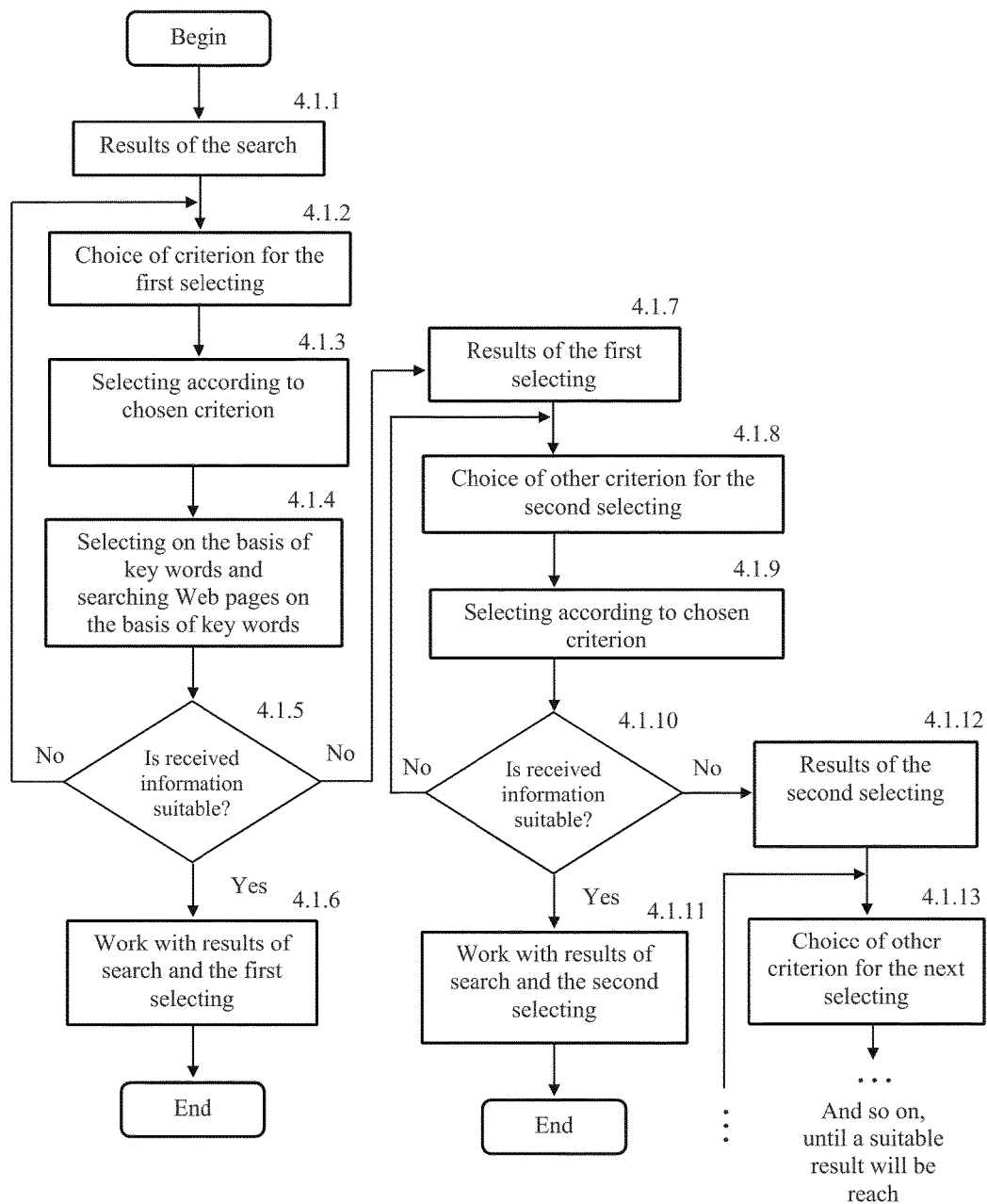
FIG. 9 is a block diagram showing a process of stepwise selecting.

As a result of searching, the searcher of information will get a list of addresses of Web sites and Web pages, which are stored in the database and correspond to the selected division of the Global Classification of Information in the Internet. The obtained list of results can be large and contain thousands of addresses of Web sites and Web pages. Not every user would be able to review all the information. At will of users, the retrieval system can reduce considerably the received list of results by means of procedure of selecting, thus having raised conformity of results of searching to desires of the searcher of information. For user's comfort selecting of search results (4.1 FIG. 8) is offered in the proposed invention (FIG. 8, FIG. 9). As shown earlier, the retrieval system creates database of information about Web sites and Web pages after the registration procedure. A part of information from said database will be used as criterions for selecting of required data from the search results. This information comprises: a kind of information, author of information, a country, where Web site is situated, a language of information, free or to be paid for information is provided, free access or registration is needed, characteristics of information specific for selected division of the Global Classification of Information in the Internet. Moreover, the date of registration or the date of the last update of information on the Web site or the Web page, a volume of information presented on the Web site or Web pages, data confirming authenticity of information are included into this information.

A searcher of information can use two kinds of selecting: a selecting according to predetermined algorithm and a stepwise selecting. In the first case, the user himself sets algorithm of selecting. The user has to choose criterions for fulfillment of selecting from the received list of addresses of Web sites and Web pages, define priorities for these criterions and choose key words (4.2, FIG. 8). Then the retrieval system will select required data from the search results in accordance with priorities defined for the chosen criterions (4.3). That is, the retrieval system will select first the addresses of Web sites and Web pages from the list of search results in accordance with a criterion having the first priority. After that, the retrieval system will select the addresses of Web sites and Web pages from the received new list of search results in accordance with a criterion having the second priority. Then the remaining list of search results will be selected in accordance with a criterion having the third priority and so on down to the last criterion of selecting. After completion of the last step of selecting, based on chosen criterions, the retrieval system will carry out selecting from the obtained result on the basis of key words (4.4). As a result of made by the retrieval system of selecting according to predetermined algorithm, the user will receive considerably smaller in order of size the list of addresses of Web sites and the Web pages which have been selected according to chosen criterions and keywords (4.5). If for any reason the obtained information does not satisfy the user (4.6 No), he returns to the beginning of selecting and makes selecting from the originally obtained list of search results in accordance with other criterions and other priorities set to these criterions. If obtained information satisfies the user (4.6 Yes), he can proceed further a work with the obtained list (4.7). The user can save the search results before or after selecting by means of a corresponding service of the retrieval system.

In case of stepwise selecting of search results (4.1.1 FIG. 9), the user chooses one of criterions for the first selecting (4.1.2). In addition to that the searcher of information should insert required key words into corresponding fields in the retrieval system. Then, the retrieval system makes selecting from the search results in accordance with the chosen criterion (4.1.3). Hereafter the retrieval system will perform selecting on the basis of the key words, chosen by the searcher of information, and find all the Web pages from obtained result of selecting, which correspond to the defined key words (4.1.4). If obtained information satisfies the user (4.1.5 Yes), he can further proceed a work with the results of searching and selecting (4.1.6). If obtained information does not satisfy the user (4.1.5 No), he has two variants. In the first variant, the searcher of information can return to the beginning of the previous step and perform selecting, using another criterion. In the second variant (4.1.7), the searcher of information will perform selecting, using the next criterion (4.1.8) and so on (4.1.9-4.1.13, . . . ), until a suitable result is obtained. Thereat, the searcher of information uses key words inserted on the first selecting only for first step of selecting.

Figure 10:
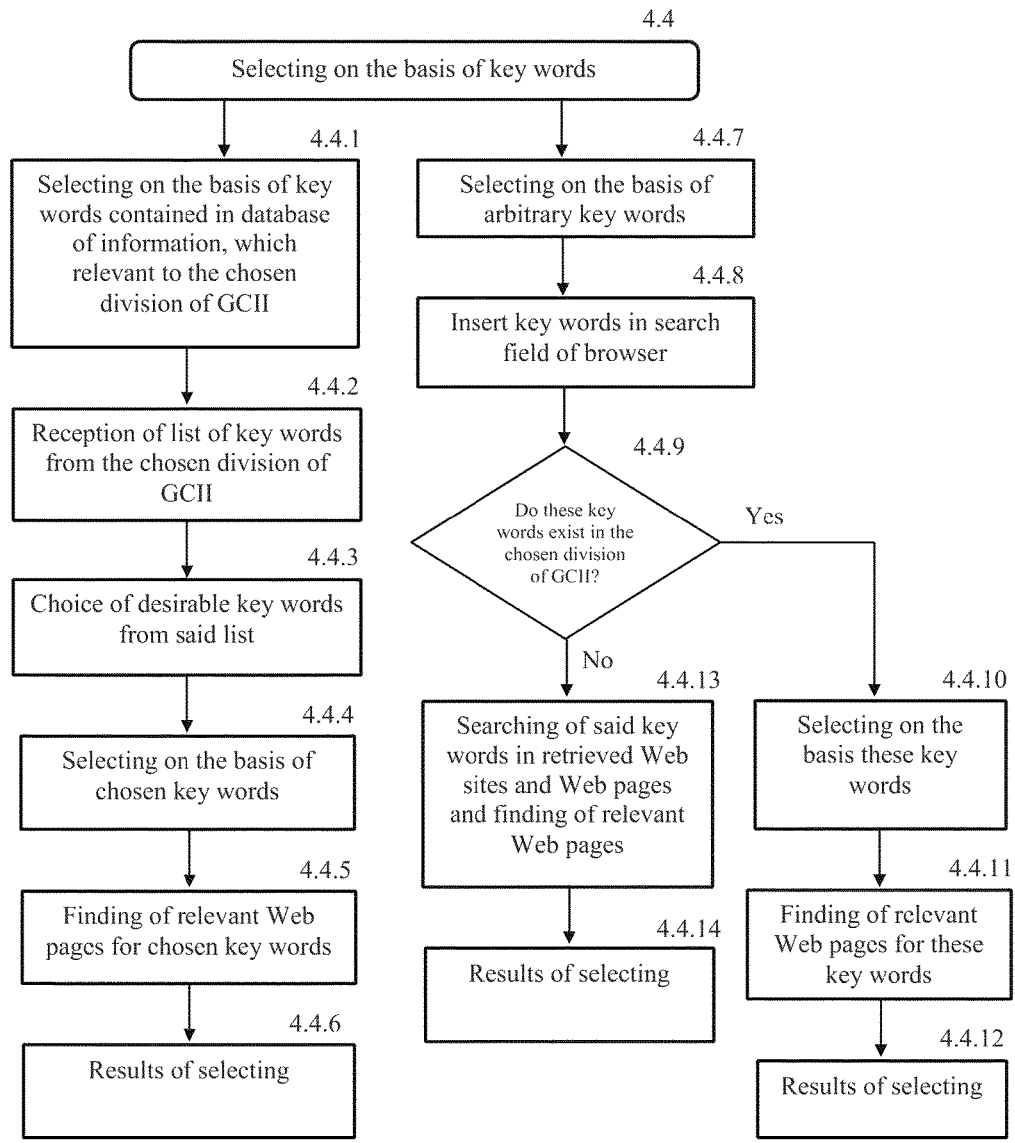
FIG. 10 is a block diagram showing a procedure of selecting on the basis of key words.

Let's consider in more detail the selecting on the basis of key words (4.4 FIG. 10). Two main methods are proposed for selecting on the basis of key words. If user chooses the first method (4.4.1), then the retrieval system proposes to the user to choose suitable key words from the list of key words situated in the database and corresponding to the selected division of the Global Classification of Information in the Internet. A list of key words will be presented in the alphabetical order using the first key word (4.4.2, 4.4.3). After choosing suitable key words, the retrieval system will select information accordingly (4.4.4). Then the retrieval system starts a program of searching on the basis key words in order to find all the Web pages of retrieved Web sites, which relevant to selected key words (4.4.5, 4.4.6).

The second method of selecting on the basis of key words provides selecting on the basis of arbitrary key words typed in by the user (4.4.7). After typing in arbitrary key words in a specified field of the retrieval system (4.4.8), the retrieval system checks whether said key words match key words in the considered division of the database, corresponding to the selected division of the Global Classification of Information in the Internet. In case of the occurrence of the same key words in said division of the database (4.4.9 Yes), the retrieval system sorts and selects information in accordance with these key words (4.4.10). Then the retrieval system starts a program of searching on the basis of key words (web spider) in order to find all the Web pages of retrieved Web sites, which relevant to selected key words (4.4.11, 4.4.12) like in the first case. If there are no such key words in said division of the database (4.4.9 No), then the retrieval system will start a program of searching on the basis of said key words (web spider) in order to find these key words in all retrieved Web pages and to choose information (4.4.13, 4.4.14) relevant to these key words.

Figure 11:
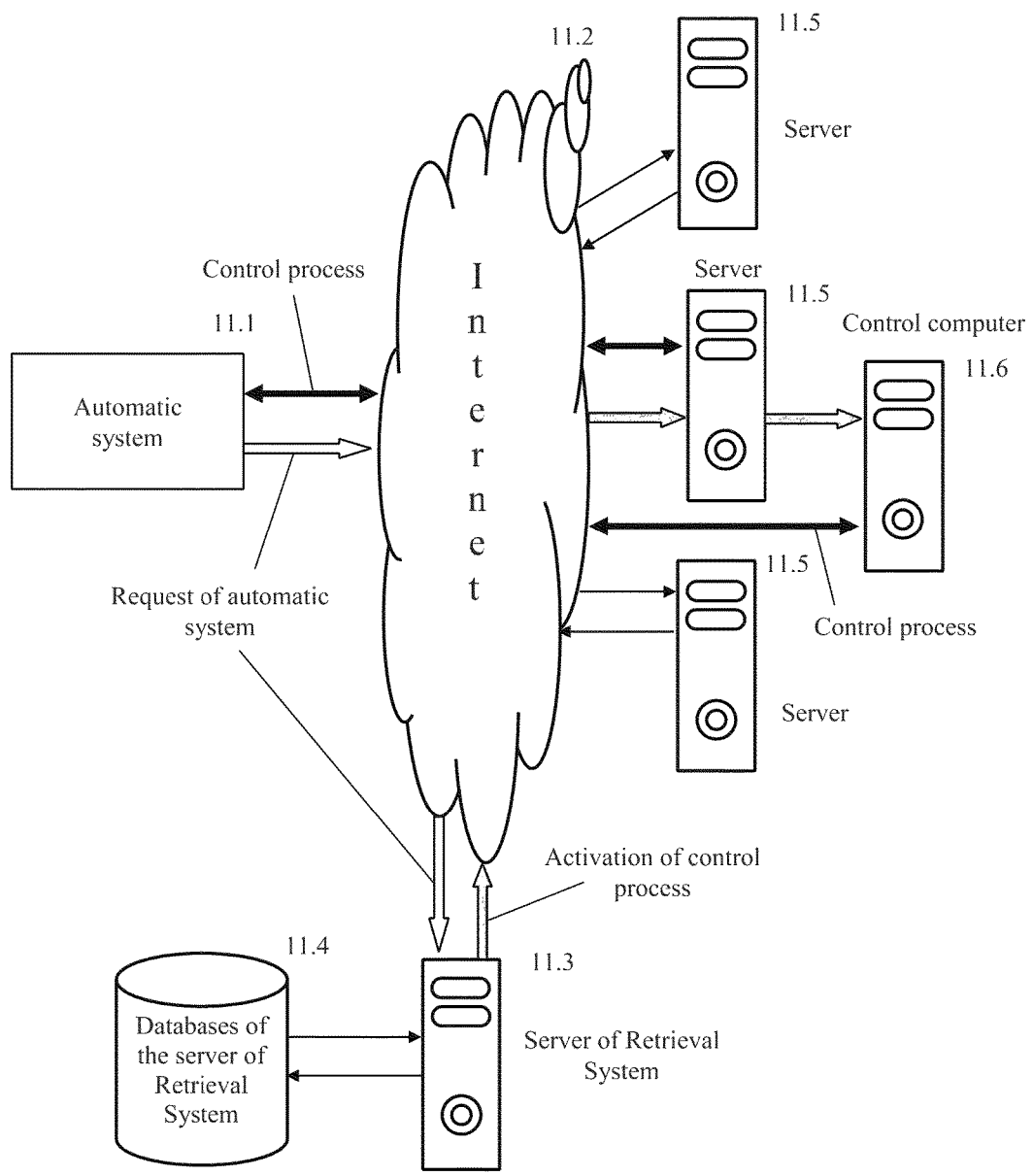
FIG. 11 is a picture showing organization of a data transfer for automation systems.

The retrieval system and the Global Classification of Information in the Internet can be used for coding and storing information in the Internet that could be used for automatic control, automatic data exchange and functioning of automatic systems (FIG. 11). As an example of automatic systems which can controlled with the help of the Internet, it is possible to name monitoring of a technical condition of complicated and remote technical objects, for example: compressors and electric motors of compressors of compressor stations of the gas transmission pipelines, wind generators and so on. Information support for navigation systems of vehicles, ships or airplanes are other examples of possible applications of data exchange between automatic systems. Other examples for such a data exchange are also information support for meteorological services, sophisticated motion control, control of machines, control of automatic production lines and so on. Control programs can be stored on network servers (11.5) or on other computers connected with the Internet (11.6). The data about these programs it will be stored in a database of the retrieval system (11.4). In this case the supplier of information dedicated for automatic systems will have to register this information accordingly in the retrieval system. The supplier of information will have to include the corresponding URL address, the name of the owner of information, an official address of the owner of information, an e-mail address, the name of the division of the Global Classification of Information in the Internet to which the provided information is related, a kind of information according to the Classification of Kinds of information. Thus, the retrieval system (FIG. 1, FIG. 11), the automatic systems (11.1), connected with the Internet (11.2) and registered in the retrieval system, the database of retrieval system (11.4), where data about control programs are stored and which are systematized in accordance with the Global Classification of Information in the Internet, servers or computers of users (11.5, 11.6), where control programs are stored, can are considered as a system of hardware and software used for control of automatic systems by means of the Internet (FIG. 11).

Information for automatic control and operation must have a strictly defined search path. Therefore data on this information must be stored in the section of the database of the retrieval system corresponding to the end division of the Global Classification of Information in the Internet. Besides, this information must be of a specific type as described in the manual of the retrieval system. This could, for instance, be "information for automatic control", "information for operation of automatic systems" and so on.

After the registration procedure, the retrieval system will sort the information for automatic control and operation in accordance with the Global Classification of Information in the Internet and store the acquired information in the part of the database corresponding to the division of the Global Classification of Information in the Internet. The following data will be stored: the code of information according to the Global Classification of Information in the Internet, the code of the kind of information according to the Classification of Kinds of information, URL address, and additional information dedicated to the automatic control and operation.

In order to be able to use the service of the retrieval system for arranging information interchange between automatic systems, the owner of the automatic system has to complete the registration procedure. The owner of the automatic system has to specify the IP address used by the automatic system, the name of the owner of the automatic system, an official or a home address of the owner of automatic system, an e-mail address. Upon completion of the registration procedure, the owner of automatic system will acquire a password for entering in the retrieval system.

Figure 12:
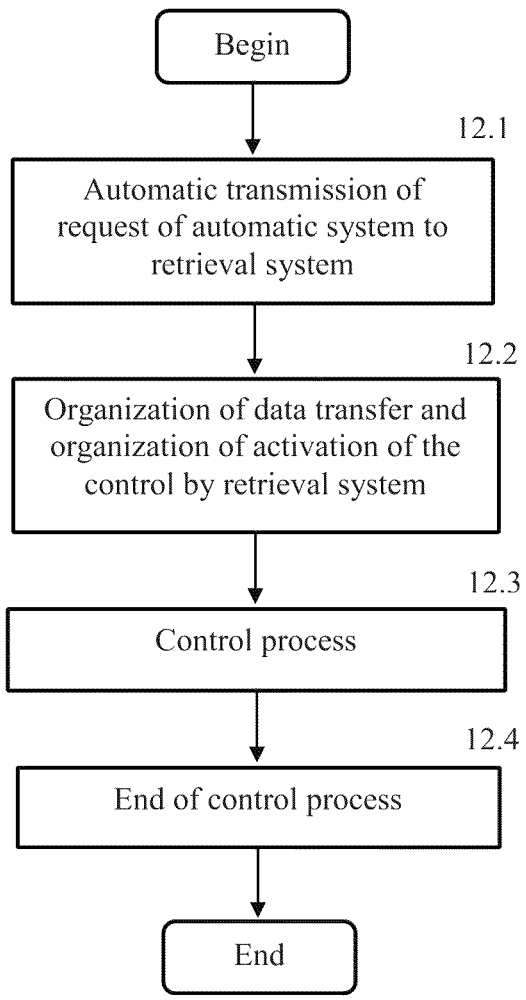
FIG. 12 is a block diagram showing organization of a data transfer for automation systems.

In order to activate the process of information interchange, the automatic system has to send a request to the server of the retrieval system (11.3) by means of the operator of automatic system or in the automatic mode (FIG. 11 and item 12.1 in FIG. 12) specifying the user password. This request except the password of the user will include the code of information according to the Global Classification of Information in the Internet, the code of the kind of information according to the Classification of Kinds of information, URL address of control information, an instruction file containing a description on how the information transfer must be implemented including a transfer protocol and other conditions for information transfer. In case if the specified information code points to a certain section in the Global Classification of Information in the Internet rather than to a specific reference within a section, the information retrieval system will search for the most suitable reference. Such a search is conducted within a limited number of links, which will provide a fast response. The retrieval system finds the mentioned information in its database (item 11.4 FIG. 11). After the required or directly requested link is found, the instruction file is opened and analyzed. The retrieval system organizes the data transfer in accordance with the instruction file (12.2 FIG. 12, FIG. 11). This could be establishing a connection with a server (11.5) or controlling computer (11.6), reading the control information (FIG. 11) or any other information dedicated for automatic systems and terminating the connection. This could also be establishing a connection with an automatic control device through the server of the retrieval system and terminating connection with the server and so on (12.2-12.4 FIG. 12, FIG. 11). An instruction file can contain commands for creating a control program out of different control programs distributed in the Internet. If necessary the automatic system can use an intermediate service that, for instance, could allow data conversion from the format of the supplier of information into the format of the user of information and vice versa. This way the retrieval system would be able not only to establish a direct connection between the suppliers of information and the users of information, but also to create more elaborate schemes and data transfer structures.

The retrieval system and the Global Classification of Information in the Internet can be used for coding and storing information in the Internet that could be used for automatic collecting of information by means of autonomously operating programs as well as for information exchange between autonomously operating programs. As an automatic collecting of information we will understand process of an automatic selection of a demanded material according to request of the user. As a result of automatic collecting of information the user will receive not the list of Web sites or Web pages, concerning request of the user. This material will represent a text file, generated by the special program of search. Text fragments, drawings, photos will be included into this text file taken from various Web sites or Web pages referring to a source of the information or without reference. It is executed according to request of the user an information selection on this or that theme. It is the full report on the given theme from available at present in the Internet of the information, registered in the retrieval system. Automatic collecting of information implies the presence of certain standards for the representation of information. In order to make information suitable for automatic collecting, a supplier of information must either create his Web site or Web page in the specified format, or provide additional files containing information dedicated for automatic collecting. Information dedicated for automatic collecting must be split into information elements, which could be used or considered separately. Headings of information elements can be concluded in special tags. The content of additional files as well as the format of the presented information must be in accordance with the considered division of the Global Classification of Information in the Internet.

Automatic collecting of information is an optional service. A supplier of information is able to refuse from providing information for automatic collecting. If he wishes to make his information available for automatic collecting, he will have to complete an additional registration procedure. During this procedure he will have to provide a file created in accordance with the standard of retrieval system for considered division of the Global Classification of Information in the Internet. Instead of creating such a file himself, the user will be able to use a corresponding program of the retrieval system for creating such a file. During registration the retrieval system will check whether the file corresponds to the standard. If necessary some changes will be requested. In order to facilitate automatic generation of such files, the retrieval system will provide corresponding libraries, programs and services.

After registration procedure is completed, some files would be suitable as for a common use, as for the automatic collecting.

After registration procedure is completed, the retrieval system will conduct sorting of data on information dedicated for automatic collecting on basis of the Global Classification of information in the Internet. The data on this information will be stored in the database of the retrieval system.

It is possible that certain Web pages could be related to a few sections of the Global Classification of Information in the Internet. Such files will have a few registration numbers. This means that the retrieval system will have a few links on the Web page or the same file.

In order to conduct automatic collecting of information, the searcher of information will have to send a request to the retrieval system including: the name or code of the division of the Global Classification of Information in the Internet, key words defining the content of information to be found, a code of a kind of information according to the Classification of Kinds of information, the language of information, characteristics of information specific for the considered division of the Global Classification of Information in the Internet. Additionally the searcher of information can include in the request a necessary level of authenticity of information according to recommendation of the retrieval system. In addition to that the searcher of information can include in the request a date of publication of information or a preferred time range, a country where this information was published, an author or authors or the owner of information. If the user has an access to Web sites where registration is required, corresponding registration information could be provided in the request.

The searcher of information will have a possibility to record his actions in the retrieval system into a macro. He can also record preparation of a request for automatic collecting of information. The user will be able to modify macros.

After the request for automatic collecting of information is sent, the retrieval system will start a program for automatic searching and collecting of information. This program will first find the links on the required Web sites and Web pages. These Web sites and Web pages must be available for automatic collecting of information. After that the program will carry out an analysis of headings of information elements and analysis of information in information elements of the found Web sites and Web pages. Then the program will produce an output, for instance, in a form of file out of information elements collected from the found Web sites and Web pages with or without reference being provided depending on the user's choice. Some examples for automatic collecting of information are: collecting news or facts on a certain event, collecting of historical information, collecting of information for educational or technical purposes and so on.

The searcher of information will be able to create his own program for searching or automatic collecting of information. He will be able to use this program without actually starting the retrieval system. In order to be able to use the database of the retrieval system, the user has to be registered accordingly in the retrieval system. In this case the retrieval system will provide the user with a password for accessing the database of the retrieval system. This password must be included into the program for searching and/or automatic collecting of information. This service of the retrieval system will be provided for a certain fee. In order to facilitate creating a program for searching or automatic collecting of information, corresponding examples will be provided along with modules and libraries written in all the popular programming languages.

In order to increase the speed of automatic collecting of information, the most popular information will be located directly in the database of the retrieval system.

What is claimed is:

1. A method of operating of a retrieval system, intended for searching of information in the Internet, wherein the retrieval system possesses by a combination of properties:
  1) the retrieval system comprises a server of the retrieval system, which comprises: a Web site of the retrieval system, with programs of searching, and physical media of storage of information, where a database of a Global Classification of Information in the Internet, a database of a Classification of Kinds of information, a database of information about Web sites, and a database of information about control programs are stored;
  2) the server of the retrieval system connects by means of the Internet with one or more servers, where Web sites of information suppliers are stored, and the retrieval system communicates with these servers with help of the Internet;
  3) the server of the retrieval system connects with one or more computers of searchers of information and with one or more computers of information suppliers by means of the Internet, and the retrieval system communicates with these computers with help of the Internet;
  4) the server of the retrieval system connects by means of the Internet with automatic systems and with servers or computers, where control programs for control of automatic systems are stored, wherein automatic systems are remote technical objects, wherein said technical objects comprise: compressors and electric motors of compressors of compressor stations of gas transmission pipelines, wind generators, navigation systems of vehicles, ships or airplanes, technical objects of meteorological services, technical objects with motion, machines, and automatic production lines, and wherein the retrieval system communicates with these technical objects and with these servers or computers with help of the Internet; and
  5) the retrieval system and automatic systems, which are connected by means of the Internet, the database of information about control programs, and servers or computers, where control programs are stored, represent a system of hardware and software, which is designed for control of the automatic systems with help of the Internet, wherein the automatic systems represent remote technical objects;
and wherein the method of operating of the retrieval system, intended for searching of information in the Internet, wherein the retrieval system possesses by said combination of properties, comprises a combination of:
  a) development of a Global Classification of Information in the Internet, which is a hierarchical tree with names and corresponding codes of all divisions and subdivisions of information, which is stored in the Internet, and wherein the Global Classification of Information in the Internet includes characteristics of information, specific for the every division and subdivision; and storing of the Global Classification of Information in the Internet in the database of the Global Classification of Information in the Internet, located on physical media of storage of information of the server of the retrieval system;
  b) development of a Classification of Kinds of information, wherein kinds of information comprise:
    1) news,
    2) advertisings,
    3) announcements,
    4) scientific information,
    5) information of electronic shops,
    6) comments, and
    7) blogs;
  and storing the Classification of Kinds of information in the database of the Classification of Kinds of information, located on physical media of storage of information of the server of the retrieval system;
  c) registering of information about Web sites, provided by information suppliers, wherein these Web sites are stored on servers in the Internet, and wherein registration is carry out with help of the Web site of the retrieval system and with help of computers of information suppliers, which are connected with the Internet, and wherein the registration comprises at least of filling of an application form, comprising data of:
    1) URL address of a Web site of an information supplier,
    2) a name of an owner of the Web site,
    3) a home address or an official address of the owner of the Web site,
    4) an e-mail address of the information supplier,
    5) a name of a division of the Global Classification of Information in the Internet, to which this Web site is related in opinion of the information supplier,
    6) key words, which characterize information, presented in the Web site,
    7) a kind of information, contained in the Web site, according to the Classification of Kinds of information,
    8) an author of information, contained in the Web site,
    9) a country, where the Web site is situated,
    10) a language of information, contained in the Web site,
    11) a free or fee-based information, which is contained in the Web site,
    12) a free access to information of the Web site or a registration procedure is needed for access to information of the Web site, and
    13) characteristics of information, contained in the Web site, specific for selected division of the Global Classification of Information in the Internet;
  d) evaluation of Web sites, provided by information suppliers, by the retrieval system, wherein the evaluation comprises:
    1) evaluation of Web sites, provided by information suppliers, by the retrieval system with respect to readability of these Web sites by Internet browsers,
    2) evaluation of Web sites by the retrieval system with respect to compliance of Web sites to general aspects of Web technology, national and international legal regulations, and 3) evaluation of Web sites by the retrieval system with respect to authenticity of information, which is contained in Web sites;
e) payment by information suppliers of a fee for a registration of information about Web site in the retrieval system and payment by information suppliers of a fee for service, provided by the retrieval system, wherein these payments comprise a combination of properties:
   1) these payments switch mutual relation of the retrieval system and an information supplier to a frame of a contract relation,
   2) the retrieval system is obliged to deliver information of the information supplier to searchers of information, and
   3) the information supplier can demand of improving of quality of service, provided by the retrieval system;
f) writing of information about Web sites, provided by information suppliers, in the database of information about Web sites and storing of said information, where this information for every registered Web site comprises:
   1) URL address of a registered Web site,
   2) a code of division of the Global Classification of Information in the Internet, to which this Web site is related,
   3) key words concerning to main content of the Web site,
   4) a kind of information, contained in the Web site, according to the Classification of Kinds of information,
   5) an author of information, contained in the Web site,
   6) a country, where the Web site is situated,
   7) a language of information, contained in the Web site,
   8) a free or fee-based information, which is contained in the Web site,
   9) a free access to information of the Web site or a registration procedure is needed for access to information of the Web site,
   10) data characterizing an authenticity of information, contained in the Web site,
   11) volume of information, contained in the Web site,
   12) a date of the registration of information about Web site in the retrieval system or a date of update of information, contained in the Web site, and
   13) characteristics of information, contained in the Web site, specific for selected division of the Global Classification of Information in the Internet;
wherein the database of information about Web sites represents a table of relational database, which comprises a combination of properties:
   1) one of columns of the table comprises primary keys,
   2) codes of information according to the Global Classification of Information in the Internet and codes of kind of information according to the Classification of Kinds of information are represented by foreign keys of corresponding related tables of the database,
   3) other data of the table are represented in a text or a digital format, and
   4) data about each Web site are contained in one row of the table of the database;
g) choice of a needed division of the Global Classification of Information in the Internet by a searcher of information, wherein the choice comprises one of two ways:
   1) first way represents manual choice of the needed division of the Global Classification of Information in the Internet with help of browser of the retrieval system and the hierarchical tree of the Global Classification of Information in the Internet; or
   2) second way represents an automatic search in a list of divisions of the Global Classification of Information in the Internet by the retrieval system on the basis of a combination of key words, which the searcher of information gives to the retrieval system, and choice of the needed division of the Global Classification of Information in the Internet from this list;
h) preparation of a request for searching of required Web sites in the Internet by a searcher of information, wherein this request comprises of inserting of a name of division of the Global Classification of Information in the Internet in a searching window of a browser of the retrieval system;
i) searching of needed information, in accordance with the request of a searcher of information, which comprises a name of division of the Global Classification of Information in the Internet, in the database of information about Web sites of the retrieval system, according to the name and code of said division of the Global Classification of Information in the Internet, by the retrieval system and providing of the searcher of information by a result of searching, wherein the result of searching comprises a list of addresses of Web sites;
j) selecting of required data from the result of searching, which is represented in form of a list of addresses of Web sites, for searchers of information according to predetermined algorithm of selecting and providing of a searcher of information by a result of selecting, or selecting of required data from the result of searching, which is represented in form of a list of addresses of Web sites, according to stepwise selecting, and providing of a searcher of information by a result of selecting, wherein the result of selecting comprises a new list of addresses of Web sites, which is smaller than the list of addresses of Web sites, received in result of searching;
k) organization of an automatic collection of information by means of the retrieval system out of Web sites, which are stored on servers in the Internet, wherein the automatic collection of information comprises a combination of properties:
   1) Web sites, which are dedicated for the automatic collection of information, are separated into information elements, which can be used or considered separately,
   2) headings of these information elements have special tags,
   3) a search of links on required Web sites is carried out in database of the retrieval system,
   4) an analysis of headings of information elements and analysis of information, contained in information elements of found Web sites, is carried out by the retrieval system in servers in the Internet, where these found Web sites are situated, and
   5) a result of the automatic collecting of information is provided in form of a text file, which consists of collected information elements, which comprise both fragments of text, and drawings and photos, and wherein this file can include references about sources of information;
and
l) organization of an automatic control and of functioning of remote technical objects by means of the Internet and the retrieval system and organization of automatic data exchange between remote technical objects and servers or computers, where control programs are situated, by means of the Internet and the retrieval system, wherein said technical objects comprise:
1) compressors and electric motors of compressors of compressor stations of gas transmission pipelines,
2) wind generators,
3) navigation systems of vehicles, ships or airplanes,
4) technical objects of meteorological services,
5) technical objects with motion,
6) machines, and
7) automatic production lines.

2. The method according to claim 1, wherein selecting of required data from the result of searching, which represents the list of addresses of Web sites, according to predetermined algorithm of selecting for searchers of information comprises a combination of steps:
a) choosing of any combination of criterions and ranking of selected criterions of information about Web site for selecting by a searcher of information, where said criterions comprise:
1) a kind of information, contained in Web site, according to the Classification of Kinds of information,
2) an author of information, contained in Web site,
3) a country, where Web site is situated,
4) a language of information, contained in Web site,
5) an authenticity of information, contained in Web site,
6) a date of the registration of information about Web site in the retrieval system or a date of last update of information of Web site,
7) a free or fee-based information, which is contained in Web site,
8) a free access to information of Web site or a registration procedure is needed for access to information of Web site,
9) volume of information, contained in Web site, and
10) characteristics of information, contained in Web site, specific for selected division of the Global Classification of Information in the Internet;
b) choosing of key words by the searcher of information;
c) selecting of required data from the result of searching by the retrieval system according to numerical order of chosen criterions, wherein this selecting comprises:
1) selecting of addresses of Web sites from the result of searching in accordance with a criterion, having first priority, by the retrieval system and receiving of a new list of result, corresponding to first criterion,
2) then selecting of addresses of Web sites from previous result of selecting in accordance with a criterion, having second priority, and receiving of a new list of result, corresponding to second criterion, and
3) so on to last from chosen criterions and receiving of a result of selecting of this step;
d) selecting of required data from the result of selecting, which have been got in previous step, by the retrieval system on the basis of key words and providing of the searcher of information by a result of selecting;
e) analyzing of the result of selecting by the searcher of information;
f) repeating of selecting of required data from the result of searching according to predetermined algorithm with other criterions, if obtained information not satisfies of the searcher of information; and
g) receiving by the searcher of information of a final result of selecting, which represents a new list of addresses of Web sites, which is smaller than the list of addresses of Web sites, received in result of searching.

3. The method according to claim 1, wherein selecting of required data from the result of searching, which represents the list of addresses of Web sites, for searchers of information according to stepwise selecting comprises a combination of steps:
a) choosing of key words, which will use for the first step of selecting, by a searcher of information;
b) choosing of first criterion for selecting by the searcher of information, where said criterions of selecting comprise:
1) a kind of information, contained in Web site, according to the Classification of Kinds of information,
2) an author of information, contained in Web site,
3) a country, where Web site is situated,
4) a language of information, contained in Web site,
5) an authenticity of information, contained in Web site,
6) a date of the registration of information about Web site in the retrieval system or a date of last update of information, contained in Web site,
7) a free or fee-based information, contained in Web site,
8) a free access to information of Web site or a registration procedure is needed for access to information of Web site,
9) volume of information, contained in Web site, and
10) characteristics of information contained in Web site, specific for selected division of the Global Classification of Information in the Internet;
c) selecting of required data from the result of searching according to selected criterion by the retrieval system and receiving of a result of selecting, corresponding to selected criterion;
d) selecting of required data from the result of selecting, corresponding to selected criterion, by the retrieval system on the basis of key words and providing of the searcher of information by a result of selecting of this step;
e) analysis of the result of selecting by the searcher of information;
f) continuation of selecting of required data from the result of selecting, which have been got in this step, with next criterion, if obtained result of selecting not satisfies of the searcher of information, until a suitable result will not be reached; and
g) receiving by the searcher of information of a final result of selecting, which represents a new list of addresses of Web sites, which is smaller than the list of addresses of Web sites, received in result of searching.

4. The method according to claim 1, where the organization of an automatic collection of information by means of the retrieval system out of Web sites, which are stored on servers in the Internet, wherein the automatic collection of information comprises a combination of properties: 1) Web sites, which are dedicated for the automatic collection of information, are separated into information elements, which can be used or considered separately, 2) headings of these information elements have special tags, 3) a search of links on required Web sites is carried out in database of the retrieval system, 4) an analysis of headings of information elements and analysis of information, contained in information elements of found Web sites, is carried out by the retrieval system in servers in the Internet, where these found Web sites are situated, and 5) a result of automatic collecting of information is provided in form of a text file, which consists of collected information elements and which can include both fragments of text, and drawings and photos, and wherein this file can include references about sources of information, and wherein a procedure of realization of the automatic collection of information by means of the retrieval system comprises a combination of steps:
  a) registration of information about Web sites, which are dedicated for automatic collecting of information, in the retrieval system;
  b) converting of information, contained in Web site, dedicated for the automatic collecting of information into a format corresponding to a standard of the retrieval system, wherein this conversion can either be done by a provided program of the retrieval system, or a converted file can also come directly from a supplier of information, and storing this Web site in a server, connected with the Internet;
  c) storing of information about Web sites, which are dedicated to the automatic collecting of information, in the database of the retrieval system in accordance with code of division of the Global Classification of Information in the Internet;
  d) creating a request for the automatic collecting of information out of Web sites, which are stored on servers in the Internet, by a searcher of information comprising at least:
    1) a name of a division of information according to the Global Classification of Information in the Internet,
    2) key words, reflecting a content of information,
    3) a code of kind of information according to the Classification of Kinds of information,
    4) a language of information,
    5) characteristics of information, specific for the considered division of the Global Classification of Information in the Internet, and
    6) data included on optional of the searcher of information: an authenticity of information, a date of publication of information or a preferred time range, a country, where this information was published, an author or authors of information, and a name of Web sites, where registration procedure is required;
  e) the automatic collecting of information out of Web sites, which are stored on servers in the Internet, using a program for automatic searching and collecting information or using a program for automatic collecting of information, made by a user, wherein the automatic collecting of information comprises:
    1) searching for required addresses of Web sites and Web pages in the database of the retrieval system according to the request of the searcher of information,
    2) an analysis of headings of information elements and analysis of information, containing in information elements of found Web sites and Web pages, in servers in the Internet, where found Web sites and Web pages are situated, wherein required addresses of Web sites and Web pages are found in the previous step, and
    3) providing of the searcher of information by the result of the automatic collecting of information, consisting from information elements, acquired from found Web sites or Web pages in the form of a text file, which comprise both fragments of text, and drawings and photos, with or without a reference for each source being provided.

5. The method according to claim 1, where the organization of an automatic control and functioning of remote technical objects by means of the Internet and the retrieval system and organization of automatic data exchange between remote technical objects and servers or computers, where control programs are situated, by means of the Internet and the retrieval system, wherein said technical objects comprise: 1) compressors and electric motors of compressors of compressor stations of gas transmission pipelines, 2) wind generators, 3) navigation systems of vehicles, ships or airplanes, 4) technical objects of meteorological services, 5) technical objects with motion, 6) machines, and 7) automatic production lines, and wherein the organization of the automatic control and functioning of remote technical objects by means of the Internet and the retrieval system and organization of automatic data exchange between remote technical objects and servers or computers, where control programs are situated, by means of the Internet and the retrieval system comprises a combination of steps:
  a) registration of information about control programs in the retrieval system, wherein the information about control programs is provided by owners of control programs, wherein control programs are stored in servers or computers in the Internet, wherein control programs are dedicated for automatic systems, wherein these automatic systems are remote technical objects, and wherein this information for every control program comprises:
    1) URL address of a control program,
    2) a name of an owner of the control program,
    3) an official address of the owner of the control program,
    4) a name of a division of the Global Classification of Information in the Internet, to which the control program is related, and
    5) a kind of information, which characterizes information about the control program, according to the Classification of Kinds of information,
  b) forming a database of information about control programs in the server of the retrieval system on the basis of data, provided by owners of control programs, wherein information about every control program in the database comprises:
    1) a code of division of the Global Classification of Information in the Internet, to which a control program is related,
    2) a code of a kind of information, which characterizes information about the control program, according to the Classification of Kinds of information,
    3) URL address of the control program, and
    4) additional information, dedicated to an automatic control and operation;
  c) registration of an automatic system, which represents a remote technical object, by an owner of the automatic system in the retrieval system, wherein the registration comprises data:
    1) IP address of the automatic system,
    2) a name of the owner of the automatic system,
    3) an official or a home address of the owner of the automatic system, and
    4) an e-mail address;
    and providing by the retrieval system of a password for entering in the retrieval system for the owner of the automatic system;
  d) forming and transfer of a request from the automatic system, which represents the remote technical object, to the retrieval system for activating an automatic control and data exchange between:
    the automatic system,
    a server or a computer, where a control program is situated, and the retrieval system, by an operator of the automatic system or by the automatic system in an automatic mode, wherein said request comprises:
1) the password of the automatic system for entering in the retrieval system,
2) a code of division of the Global Classification of Information in the Internet, to which the control program is related,
3) a code of a kind of information, which characterizes information about the control program, according to the Classification of Kinds of information,
4) URL address of the control program, and
5) a file with an instruction, about how data transfer could be arranged, including an information transfer protocol and other conditions for organizing data transfer;

e) connecting of the automatic system, which represents the remote technical object, with the server or with the computer, where the control program is situated, and wherein the server or the computer is connected with the Internet, f) reading a file with an instruction, about how data transfer could be arranged, from the server or from the computer, where the control program is situated, analyzing the instruction by the retrieval system, organizing data transfer by the retrieval system from the server or from the computer, containing required control program, supplying the control program to the automatic system, wherein the automatic system represents the remote technical object, and requesting of information during a process of data transfer; and g) implementation of automatic control and functioning of the automatic system, which represents the remote technical object.

* * * * *